US011852601B2

(12) United States Patent
Kwon et al.

(10) Patent No.: US 11,852,601 B2
(45) Date of Patent: Dec. 26, 2023

(54) ELECTRODE TERMINAL ASSEMBLY FOR LIQUID QUALITY METER APPARATUS AND LIQUID QUALITY METER APPARATUS COMPRISING SAME

(71) Applicant: KYUNGDONG NAVIEN CO., LTD., Pyeongtaek-si (KR)

(72) Inventors: Tae Seong Kwon, Seoul (KR); Ji Hyung Yoon, Seoul (KR); Jong Kil Kim, Incheon (KR)

(73) Assignee: Kyungdong Navien Co., LTD., Pyeongtaek-si (KR)

( * ) Notice: Subject to any disclaimer, the term of this patent is extended or adjusted under 35 U.S.C. 154(b) by 251 days.

(21) Appl. No.: 17/426,585

(22) PCT Filed: Dec. 13, 2019

(86) PCT No.: PCT/KR2019/017685
§ 371 (c)(1),
(2) Date: Jul. 28, 2021

(87) PCT Pub. No.: WO2020/179991
PCT Pub. Date: Sep. 10, 2020

(65) Prior Publication Data
US 2022/0099612 A1    Mar. 31, 2022

(30) Foreign Application Priority Data

Mar. 7, 2019 (KR) .................... 10-2019-0026327
Dec. 12, 2019 (KR) .................... 10-2019-0165584

(51) Int. Cl.
*G01N 27/07* (2006.01)
(52) U.S. Cl.
CPC .................... *G01N 27/07* (2013.01)

(58) Field of Classification Search
CPC ........ G01N 33/18; G01N 33/22; G01N 33/26; G01N 27/07
See application file for complete search history.

(56) References Cited

U.S. PATENT DOCUMENTS 1,670,640 A *   5/1928  Smith ................. G01N 27/07
                                                324/446
3,938,035 A *   2/1976  Fletcher ............. G01N 27/07
                                                215/247

(Continued)

FOREIGN PATENT DOCUMENTS

CA    3129588 A1 *  9/2020 ........... G01N 27/07
DE   10156203 C1 *  4/2003 ........... G01N 27/06

(Continued)

OTHER PUBLICATIONS

International Search Report and Written Opinion received in International Application No. PCT/KR2019/017685.

*Primary Examiner* — Jermele M Hollington
*Assistant Examiner* — Sean Curtis
(74) *Attorney, Agent, or Firm* — ALG Intellectual Property, LLC (57) ABSTRACT

According to the present invention, an electrode terminal assembly for a liquid quality meter apparatus for measuring liquid quality on the basis of the electrical resistance of a liquid to be measured comprises: a pair of electrode terminals comprising a body, which contacts the liquid being measured when liquid quality is measured and has an overall rod shape, and a protruding step formed at a predetermined portion between the opposite ends of the body; and a fixing body comprising a pair of electrode through-holes through which the pair of electrode terminals pass. In the electrode terminal assembly having the above-described structure, each of the pair of electrode terminals is arranged such that, when the electrode terminals are inserted into the electrode (Continued)

through-holes of the fixing body by a predetermined length, the protruding step is caught by the fixing body so that the electrode terminals are no longer inserted.

8 Claims, 4 Drawing Sheets

(56) References Cited

U.S. PATENT DOCUMENTS

| | | | | |
|---|---|---|---|---|
| 4,085,993 | A * | 4/1978 | Cairns | H01R 13/523 |
| | | | | 439/272 |
| 5,444,379 | A * | 8/1995 | Ohmi | G01N 27/07 |
| | | | | 324/448 |
| 6,683,464 | B2 * | 1/2004 | Park | G01N 27/06 |
| | | | | 324/443 |
| 7,505,857 | B2 * | 3/2009 | Howell | G01N 27/06 |
| | | | | 702/65 |
| 9,857,327 | B2 * | 1/2018 | Schneider | G01N 27/414 |
| 10,254,267 | B2 * | 4/2019 | Cheng | G01N 21/17 |
| 11,231,380 | B2 * | 1/2022 | Kameda | G01N 27/221 |
| 2002/0056634 | A1 | 5/2002 | Pitts et al. | |
| 2003/0164708 | A1 * | 9/2003 | Park | G01N 27/07 |
| | | | | 324/439 |
| 2008/0052012 | A1 * | 2/2008 | Howell | G01N 33/18 |
| | | | | 702/30 |
| 2009/0123340 | A1 * | 5/2009 | Knudsen | G01N 33/18 |
| | | | | 73/61.41 |
| 2011/0309848 | A1 * | 12/2011 | Eberheim | B22F 3/225 |
| | | | | 264/618 |
| 2014/0020451 | A1 * | 1/2014 | Kitanaka | G01N 33/22 |
| | | | | 73/53.01 |
| 2016/0139076 | A1 * | 5/2016 | Onishi | A61B 1/123 |
| | | | | 204/435 |
| 2017/0234848 | A1 * | 8/2017 | Cheng | G01N 21/17 |
| | | | | 73/61.41 |
| 2019/0187084 | A1 * | 6/2019 | Ichinari | G01N 27/08 |
| 2021/0033554 | A1 * | 2/2021 | Kameda | G01N 27/226 |
| 2022/0099612 | A1 * | 3/2022 | Kwon | G01N 27/07 |

FOREIGN PATENT DOCUMENTS

| | | | | |
|---|---|---|---|---|
| DE | 102008054659 | A1 * | 6/2010 | B22F 3/225 |
| DE | 102009020439 | B4 * | 5/2011 | G01N 27/07 |
| DE | 202021104505 | U1 * | 10/2021 | |
| EP | 2944950 | A1 * | 11/2015 | G01N 27/28 |
| EP | 3032246 | A1 * | 6/2016 | A61B 1/123 |
| EP | 3499224 | A1 * | 6/2019 | G01N 27/06 |
| EP | 3657161 | A1 * | 5/2020 | G01N 27/07 |
| JP | 2001056309 | A | 2/2001 | |
| JP | 2005519279 | A * | 6/2005 | |
| JP | 2007101419 | | 4/2007 | |
| JP | 2017026359 | | 2/2017 | |
| JP | 2017026359 | A * | 2/2017 | |
| JP | 2019049495 | A * | 3/2019 | G01N 27/07 |
| KR | 1020020082636 | | 10/2002 | |
| KR | 1020040047202 | A | 6/2004 | |
| KR | 20100107158 | A * | 10/2010 | |
| KR | 1020100107158 | | 10/2010 | |
| KR | 1020180125236 | A | 11/2018 | |
| KR | 102311921 | B1 * | 10/2021 | G01N 27/07 |
| WO | WO-2010051842 | A1 * | 5/2010 | G01N 33/1893 |
| WO | WO-2015091452 | A1 * | 6/2015 | G01N 27/07 |
| WO | WO-2019049429 | A1 * | 3/2019 | G01N 27/07 |
| WO | WO-2020179991 | A1 * | 9/2020 | G01N 27/07 |

* cited by examiner

ELECTRODE TERMINAL ASSEMBLY FOR LIQUID QUALITY METER APPARATUS AND LIQUID QUALITY METER APPARATUS COMPRISING SAME

RELATED APPLICATIONS

The present application is a U.S. National Stage Application under 35 U.S.C. § 371 of International Application No. PCT/KR2019/017685, filed on Dec. 13, 2019, which claims priority to KR Patent Application No. 10-2019-0165584, filed on Dec. 12, 2019, and to KR Patent Application No. 10-2019-0026327, filed on Mar. 7, 2019, the contents of which are hereby incorporated by reference in their entirety.

TECHNICAL FIELD

The present disclosure relates to an electrode terminal assembly for a liquid quality meter apparatus and a liquid quality meter apparatus including the same.

BACKGROUND ART

In the case of a liquid used for a certain purpose, such as water introduced into a boiler, it is important to measure the quality or pollution level of the liquid.

For example, when a boiler is operated by using water containing several dissolved substances rather than pure water, foreign matter may be generated inside the boiler, and the efficiency of the boiler may be degraded.

Particularly, in a system including a filter that is able to be turned on/off or has variable filtering performance, it may be more meaningful to measure the quality or pollution level of a liquid. This is because the liquid is able to be effectively filtered with minimum power consumption by turning on or off the filter, or setting the filtering performance to high performance or low performance, depending on the measured quality or pollution level of the liquid.

Total dissolved solids or total dissolved salts (TDS) is an indicator for the quality of a liquid, and an apparatus for measuring the TDS of a liquid is referred to as a TDS sensor or a TDS meter.

A TDS meter generally includes an electrode body assembly including electrode terminals brought into contact with a liquid to be measured, when the quality of the liquid is measured, and a controller for controlling power applied to the electrode terminals.

An electrode terminal assembly for a TDS meter in the related art is generally manufactured by a method (generally referred to as an injection-molding method) of locating electrode terminals at predetermined positions in a mold and forming a fixing body by filling the mold with a molding liquid. In the electrode terminal assembly in the related art, the electrode terminals are simply formed in a rod shape.

The electrode terminal assembly in the related art has a problem in that the electrode terminals are pushed into the fixing body when used in a high-temperature and high-pressure condition. In this case, a liquid may infiltrate between the electrode terminals and the fixing body, and water leakage may occur inside a liquid quality meter apparatus, which may lead to deterioration in durability.

Furthermore, when the electrode terminal assembly is used in a liquid at high temperature (about 80° C. or more), the molding that forms the fixing body may be dissolved, and therefore the electrode terminals may not be fixed.

DISCLOSURE

Technical Problem

An aspect of the present disclosure provides an electrode terminal assembly having a structure in which electrode terminals are able to be firmly fixed even though used in a high-temperature and high-pressure condition, and a liquid quality meter apparatus including the electrode terminal assembly.

In addition, another aspect of the present disclosure is to raise durability by preventing occurrence of water leakage in an electrode terminal assembly.

The technical problems to be solved by the present disclosure are not limited to the aforementioned problems, and any other technical problems not mentioned herein will be clearly understood from the following description by those skilled in the art to which the present disclosure pertains.

Technical Solution

To solve the above-mentioned problems, an electrode terminal assembly for a liquid quality meter apparatus according to an embodiment of the present disclosure includes a pair of electrode terminals brought into contact with a liquid to be measured, when liquid quality is measured and a fixing body including a pair of electrode through-holes through which the pair of electrode terminals pass, in which each of the electrode terminals including a body having an overall rod shape and a protrusion formed on a predetermined portion between opposite ends of the body.

When the electrode terminals are inserted into the electrode through-holes of the fixing body by a predetermined length, the protrusions are stopped by the fixing body, and the electrode terminals are not inserted any more.

To solve the above-mentioned problems, a liquid quality meter apparatus according to an embodiment of the present disclosure includes an electrode terminal assembly and a controller that applies power to the electrode terminal assembly.

The electrode terminal assembly includes a pair of electrode terminals and a fixing body including a pair of electrode through-holes through which the pair of electrode terminals pass, in which each of the electrode terminals includes a body having an overall rod shape and a protrusion protruding from the body to a side.

When the electrode terminals are inserted into the electrode through-holes of the fixing body by a predetermined length, the protrusions are stopped by the fixing body, and the electrode terminals are not inserted any more.

Advantageous Effects

According to the embodiments of the present disclosure, at least the following effects are achieved.

The electrode terminal assembly includes the pair of electrode terminals including the electrode terminal protrusions and the fixing body including the pair of electrode through-holes through which the pair of electrode terminals pass. Accordingly, even though the electrode terminal assembly is used in a high-temperature and high-pressure condition, the electrode terminals may be effectively prevented from being pushed into the fixing body.

In addition, as the electrode terminals are prevented from being pushed into the fixing body, occurrence of water leakage between the electrode terminals and the fixing body may be prevented, and thus the durability of the electrode terminal assembly may be improved.

Effects of the present disclosure are not limited to the aforementioned effects, and any other effects not mentioned herein will be clearly understood from the accompanying claims by those skilled in the art to which the present disclosure pertains.

MODE FOR INVENTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

Figure 1:
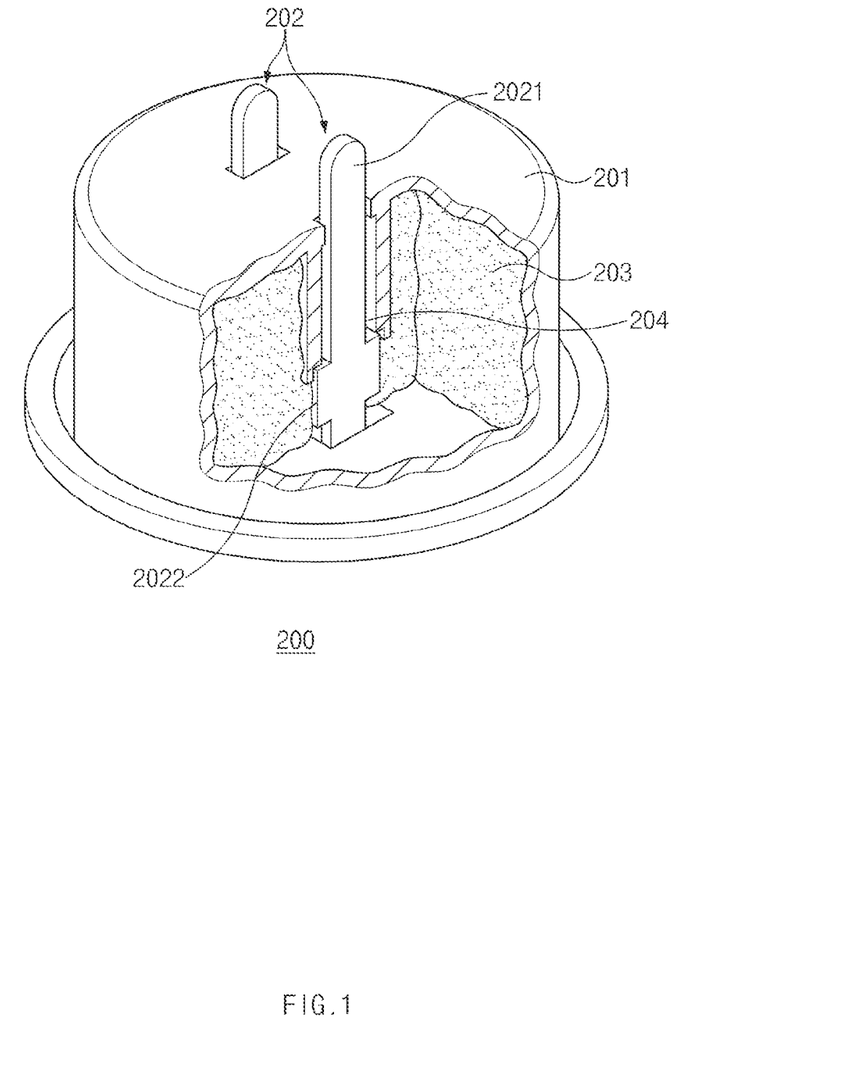
FIG. 1 is a view illustrating part of an electrode terminal assembly for an exemplary liquid quality meter apparatus.
Figure 2:
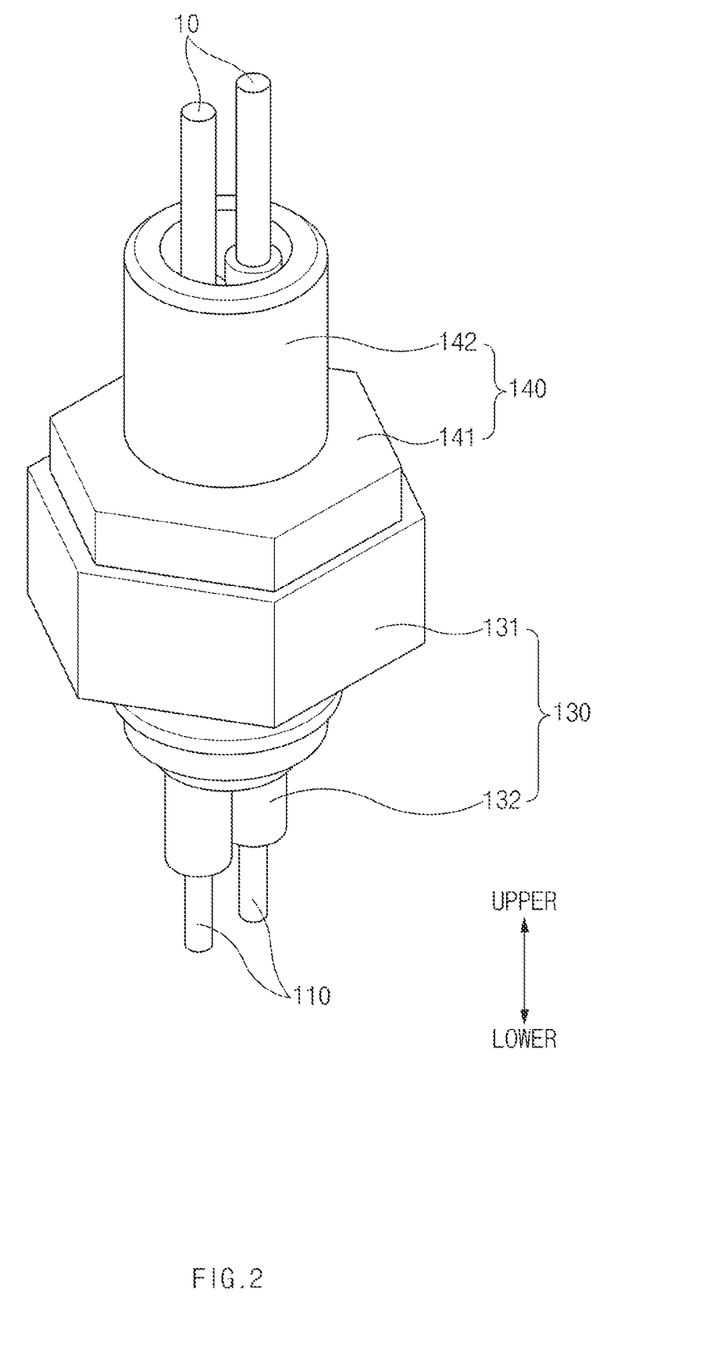
FIG. 2 is a view illustrating an electrode terminal assembly for a liquid quality meter apparatus according to an embodiment of the present disclosure.
Figure 3:
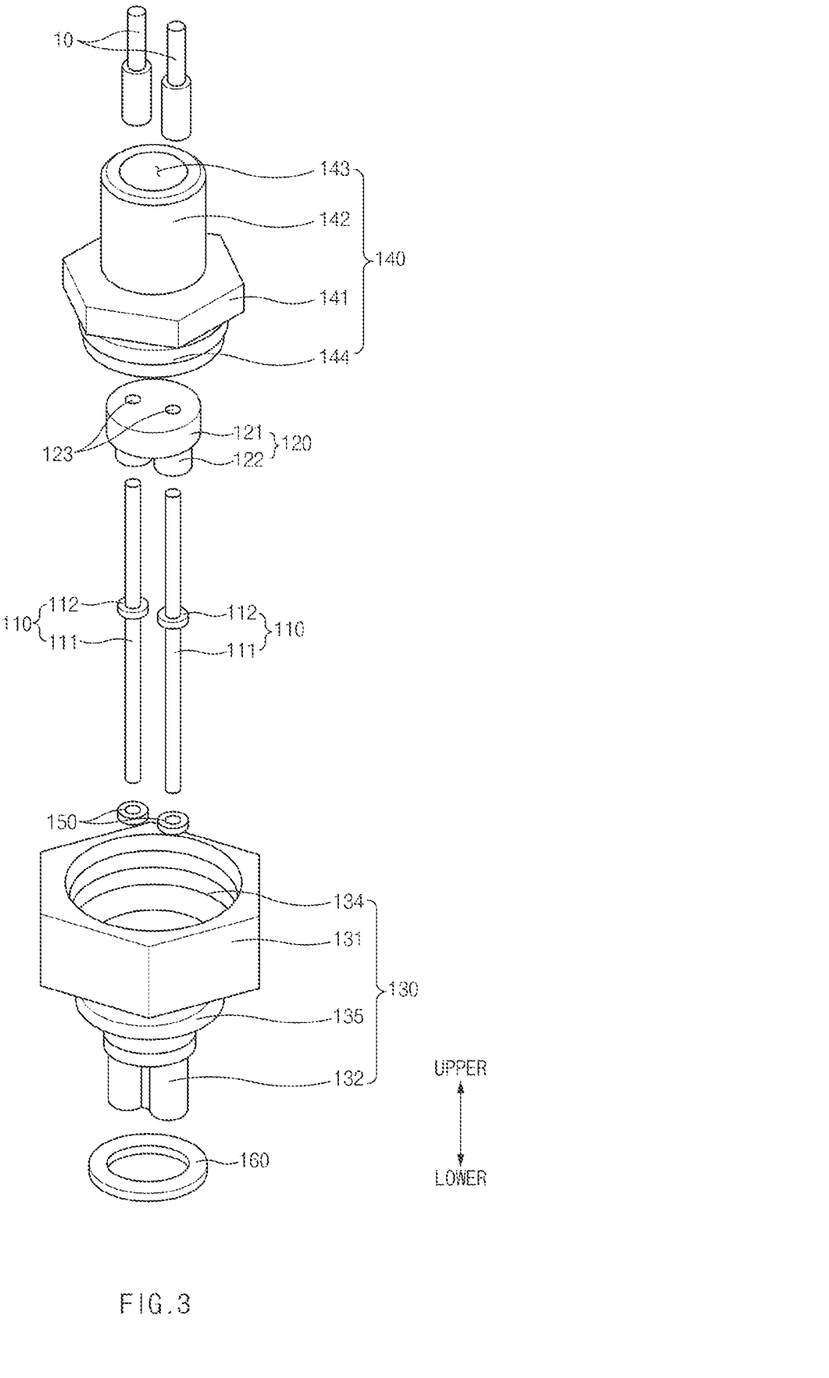
FIG. 3 is an exploded perspective view of the electrode terminal assembly of FIG. 2.
Figure 4:
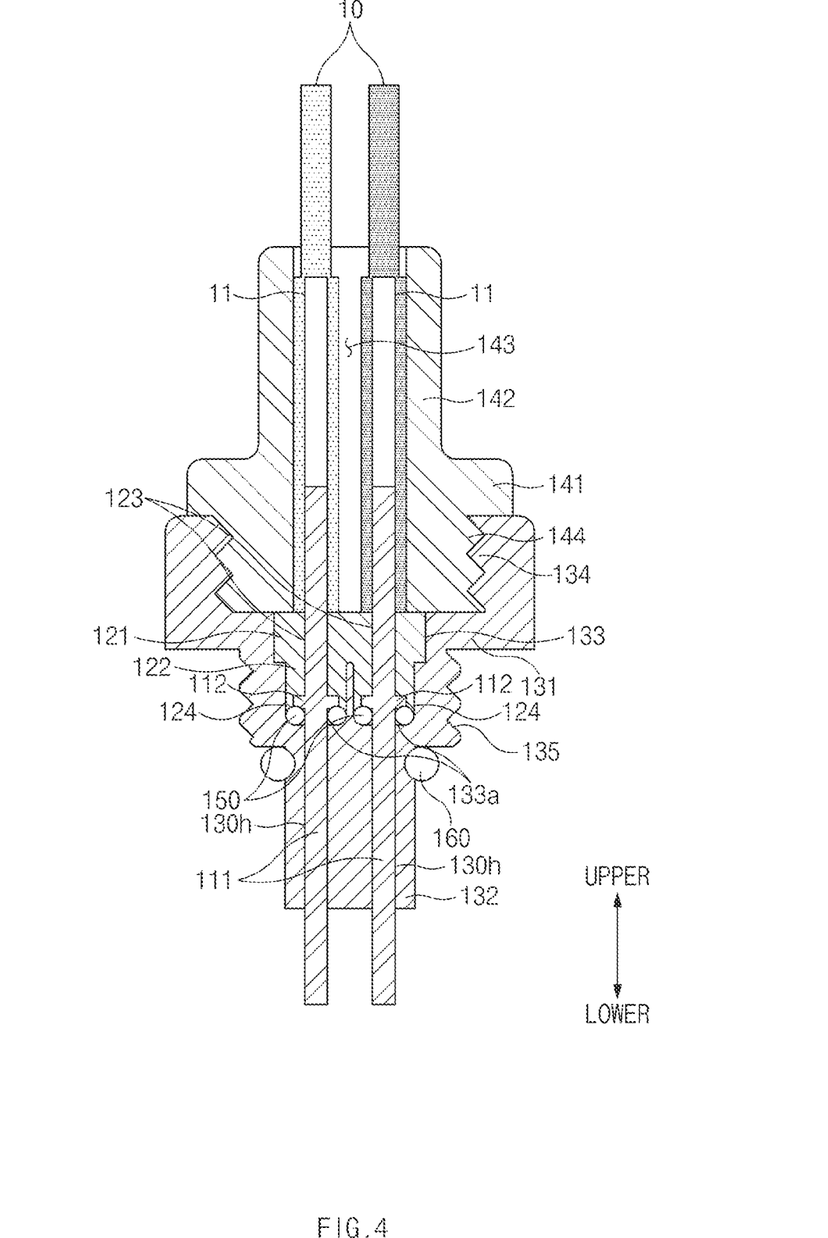
FIG. 4 is a vertical sectional view of the electrode terminal assembly of FIG. 2.

FIG. 1 is a view illustrating part of an electrode terminal assembly for an exemplary liquid quality meter apparatus. FIG. 2 is a view illustrating an electrode terminal assembly for a liquid quality meter apparatus according to an embodiment of the present disclosure. FIG. 3 is an exploded perspective view of the electrode terminal assembly of FIG. 2. FIG. 4 is a vertical sectional view of the electrode terminal assembly of FIG. 2.

The electrode terminal assembly 100 according to this embodiment may be applied to a liquid quality meter apparatus for measuring the quality of a liquid, based on the electrical resistance of the liquid to be measured.

A total dissolved solids or total dissolved slats (TDS) sensor may exemplify the liquid quality meter apparatus for measuring the quality of the liquid, based on the electrical resistance of the liquid.

Here, a total dissolved solids or total dissolved salts (TDS) value refers to the total amount of solids dissolved in water and generally refers to the total amount of ions including positive ions and negative ions dissolved in water.

A liquid quality meter apparatus, such as a TDS sensor, for measuring the quality of a liquid based on the electrical resistance of the liquid includes an electrode body assembly including electrode terminals brought into contact with the liquid to be measured, when the liquid quality is measured and a controller for controlling power applied to the electrode terminals.

The electrode terminal assembly 100 according to this embodiment includes a pair of electrode terminals 110 and a fixing body 120.

The pair of electrode terminals 110 are brought into contact with the liquid to be measured, when the quality of the liquid is measured.

The pair of electrode terminals 110 may each include an electrode terminal body 111 having an overall rod shape and an electrode terminal protrusion 112 formed on a predetermined portion between opposite ends of the electrode terminal body 111.

The fixing body 120 includes a pair of electrode through-holes 123 through which the pair of electrode terminals 110 pass.

When the pair of electrode terminals 110 are inserted into the electrode through-holes 123 of the fixing body 120 by a predetermined length, the electrode terminal protrusions 112 are stopped by the fixing body 120, and thus the pair of electrode terminals 110 are not inserted any more.

The electrode terminal assembly 100 may further include first and second housings 130 and 140 for receiving the fixing body 120 and the pair of electrode terminals 110.

The first and second housings 130 and 140 may be coupled to form an interior space in which the fixing body 120 and the pair of electrode terminals 110 are received. The fixing body 120 and the pair of electrode terminals 110 are supported by the first and second housings 130 and 140 in the direction in which the pair of electrode terminals 110 are inserted toward the fixing body 120. Accordingly, the fixing body 120 and the pair of electrode terminals 110 are prevented from being separated from each other.

The above-configured electrode terminal assembly 100 according to this embodiment is a structure provided by coupling the pair of electrode terminals 110, the fixing body 120, the first housing 130, and the second housing 140 that are separately prepared.

The positions of the pair of electrode terminals 110 relative to the fixing body 120 and the first housing 130 are limited by the electrode terminal protrusions 112 of the pair of electrode terminals 110. That is, the electrode terminal protrusions 112 formed on the pair of electrode terminals 110 prevent the pair of electrode terminals 110 from being further inserted toward the fixing body 120 and prevent the pair of electrode terminals 110 from being extracted outside the first housing 130.

An electrode terminal assembly for a liquid quality meter apparatus in the related art is generally manufactured by a method (generally referred to as an injection-molding method) of locating electrode terminals at predetermined positions in a mold and forming a fixing body by filling the mold with a molding liquid. In the electrode terminal assembly in the related art, the electrode terminals are simply formed in a rod shape.

The electrode terminal assembly in the related art has a problem in that the electrode terminals are pushed into the fixing body when used in a high-temperature and high-pressure condition. In this case, a liquid may infiltrate between the electrode terminals and the fixing body, and water leakage may occur inside a liquid quality meter apparatus, which may lead to deterioration in durability.

Furthermore, when the electrode terminal assembly is used in a liquid at high temperature (about 80° C. or more), the molding that forms the fixing body may be dissolved, and therefore the electrode terminals may not be fixed.

Accordingly, the exemplary electrode terminal assembly 200 that, as illustrated in FIG. 1, has electrode terminals 202 that have a plate-shaped body 2021 extending in one direction and have, on one region thereof, a protrusion 2022 protruding from the body 2021 in a direction not parallel to the extension direction may be considered. A stopper 204 may be formed inside a housing 201 such that the protrusions 2022 are stopped by the stopper 204 and prevented from escaping from the housing 201, and a molding 203 surrounding the electrode terminals may be formed inside the housing for sealing, by a method of filling the housing with a molding liquid and solidifying the molding liquid.

However, even in this case, although the electrode terminals 202 are prevented from being pushed by high-temperature and high-pressure, the molding 203 formed for sealing may be dissolved by high temperature, or may be cracked, to cause water leakage, and the electrode terminals 202 may be electrically connected and short-circuited.

Although a different structure rather than the molding 203, particularly, a watertight member such as an O-ring (not illustrated) that is formed of an elastic member and that blocks a boundary is disposed to overcome this problem on a portion where water leakage is likely to occur, it may be difficult to effectively maintain water tightness because the electrode terminals 202 are formed in a plate shape.

The electrode terminal assembly 100 according to this embodiment is aimed at improving durability by preventing a movement of the electrode terminals 110 due to an operating environment or condition of the electrode terminal assembly 100 (e.g., voltage applied to the electrode terminals or the temperature of the electrode terminals) and preventing water leakage of the electrode terminal assembly 100.

To this end, the electrode terminal assembly 100 according to this embodiment is characterized in that the electrode terminal assembly 100 includes the pair of electrode terminals 110 including the electrode terminal protrusion 112 and having an overall rod shape and the fixing body 120 including the pair of electrode through-holes 123 through which the pair of electrode terminals 110 pass, and when the electrode terminals 110 are inserted into the electrode through-holes 123 of the fixing body 120 by the predetermined length, the electrode terminal protrusions 112 are stopped by the fixing body 120, and thus the electrode terminals 110 are not inserted any more.

Hereinafter, features of the electrode terminal assembly 100 according to this embodiment will be described in more detail.

Referring to FIG. 2, the first and second housings 130 and 140 may be coupled with each other in an up/down direction.

The first housing 130 may include a first housing body 131 and a first housing extension 122 extending from the first housing body 131 in a downward direction in which the pair of electrode terminals 110 extend.

The first housing 130 may include a pair of first housing through-holes 130h through which the pair of electrode terminals 110 pass.

The first housing through-holes 130h may extend in the up/down direction in which the pair of electrode terminals 110 extend and may be formed through the first housing extension 122, and the pair of electrode terminals 110 may be exposed outside the first housing 130 through the pair of first housing through-holes 130h.

The second housing 140 may include a second housing body 141 coupled with the first housing body 131 and a second housing extension 142 extending from the second housing body 141 in an upward direction.

The second housing 140 may have a receiving space 143 formed therein in which a pair of terminals 10 are received. The second housing 140 may have a shape including a center hole to provide the receiving space 143 in which the pair of terminals 10 are received.

The pair of terminals 10 may be connected with the pair of electrode terminals 110, respectively, and may be connected with a controller (not illustrated) to apply power to the pair of electrode terminals 110. That is, the pair of terminals 10 may serve as a medium through which power is applied from the controller or a power supply device to the pair of electrode terminals 110.

Referring to FIG. 3, the pair of electrode terminals 110 may each include the electrode terminal body 111 having an overall rod shape and the electrode terminal protrusion 112 formed on the predetermined portion between the upper and lower ends of the electrode terminal body 111.

The electrode terminal protrusion 112 may be formed by a method of pressing the electrode terminal body 111 with a press.

In an embodiment, the electrode terminal protrusion 112 may be formed in a ring shape along a circumferential surface of the electrode terminal body 111.

The fixing body 120 may include a main body 121 and a pair of fixing body extensions 122 extending downward from the main body 121 of the fixing body 120.

The fixing body 120 may include the pair of electrode through-holes 123 through which upper ends of the pair of electrode terminals 110 pass.

The pair of electrode through-holes 123 may be formed through the main body 121 of the fixing body 120 and may be formed through the pair of fixing body extensions 122, respectively.

Accordingly, the upper ends of the pair of electrode terminals 110 may pass through the fixing body 120 and may be connected with the pair of terminals 10.

Meanwhile, unlike that illustrated in FIG. 3, one fixing body extension may be provided, and a pair of electrode through-holes may be formed through a main body of a fixing body and the fixing body extension.

Referring to FIG. 4, to receive the electrode terminal protrusions 112, the fixing body 120 may have a shape in which portions making contact with the electrode terminal protrusions 112 of the pair of electrode terminals 110 are inwardly concave.

The fixing body extensions 122 may have, in distal end portions thereof, protrusion receiving recesses 124 having a shape in which edge portions of the electrode through-holes 123 are recessed to a predetermined depth toward the insides of the fixing body extensions 122.

When the pair of electrode terminals 110 are inserted toward the fixing body 120, the electrode terminal protrusions 112 may be inserted into the protrusion receiving recesses 124, and the pair of electrode terminals 110 and the fixing body 120 may be firmly coupled together. That is, the pair of electrode terminals 110 may be more firmly fixed by the fixing body 120. This structure may prevent a situation in which the electrode terminals 110 are pushed and separated from the original positions even in a high-temperature and high-pressure environment.

Furthermore, the fixing body 120 may include the fixing body extensions 122 extending in the up/down direction in which the electrode terminals 110 extend, thereby increasing the contact surface between the electrode terminals 110 and the fixing body 120, which in turn raises the coupling force of the fixing body 120 and the pair of electrode terminals 110.

Referring to FIGS. 3 and 4, the first housing 130 may have a fixing body receiving recess 133 in which the fixing body 120 is received. The fixing body receiving recess 133 may be formed in the first housing body 131.

The pair of first housing through-holes 130h may be formed in a bottom surface 133a of the fixing body receiving recess 133 so as to be open toward the outside of the first housing 130. That is, referring to FIG. 4, the pair of first housing through-holes 130h may extend downward from the bottom surface 133a of the fixing body receiving recess 133 and may be open toward the outside of the first housing 130.

The first housing through-holes 130h may be formed in a predetermined size such that lower ends of the pair of electrode terminals 110 pass through the first housing through-holes 130h, but the electrode terminal protrusions 112 do not pass through the first housing through-holes 130h and are stopped by the bottom surface 133a of the fixing body receiving recess 133.

For example, when the electrode terminal bodies 111 have a cylindrical rod shape and the electrode terminal protrusions 112 have a ring shape with a predetermined diameter, the first housing through-holes 130h may be circular holes having a diameter that is greater than the diameter of the electrode terminal bodies 111 and is smaller than the diameter of the electrode terminal protrusions 112.

Accordingly, the lower ends of the pair of electrode terminals 110 may be exposed outside the first housing 130 by a predetermined length through the first housing through-holes 130h, but the pair of electrode terminals 110 may be prevented from being separated from the fixing body 120 and exposed outside the first housing 130 by more than the predetermined length.

One of the first and second housings 130 and 140 may have a female thread, and the other may have a male thread. The first and second housings 130 and 140 may be screw-coupled with each other.

In an embodiment, the first housing 130 may have a female thread 134, and the second housing 140 may have a male thread 144.

Accordingly, the first and second housings 130 and 140 may be firmly coupled without being easily separated from each other by vertical forces. The electrode terminals 110 may be supported upward by the first housing 130, the fixing body 120 may be supported downward by the second housing 140, and thus the coupling of the electrode terminals 110 and the fixing body 120 may be firmly maintained.

Furthermore, because the second housing 140 and the fixing body 120 are not directly coupled, but make contact with each other, the second housing 140 may press the fixing body 120 downward when coupled to the first housing 130. Due to this structure, the second housing 140 may press the fixing body 120 against the first housing 130, thereby uniformly pressing the electrode terminal protrusions 112 disposed between the fixing body 120 and the first housing 130 and inner O-rings 150 that will be described below.

To prevent infiltration of a fluid into the fixing body receiving recess 133 through the first housing through-holes 130h, the electrode terminal assembly 100 may further include a pair of inner O-rings 150 interposed between inside ends of the first housing through-holes 130h (or, the bottom surface 133a of the fixing body receiving recess 133) and the pair of electrode terminal protrusions 112. That is, a structure for fixing the electrode terminals 110 and a structure for sealing the electrode terminals 110 may be provided separately from each other.

The inner O-rings 150 may be formed of an elastic material and may be deformed by being pressed by the electrode terminal protrusions 112 or the fixing body 120 on an upper side thereof and the bottom surface 133a of the fixing body receiving recess 133 on a lower side thereof. The inner O-rings 150 may form a seal between the electrode terminal protrusions 112 or the fixing body 120 and the bottom surface 133a of the fixing body receiving recess 133. Because the electrode terminal bodies 111 are formed in a cylindrical rod shape and the electrode terminal protrusions 112 are formed in a ring shape, uniform sealing may be achieved when the inner O-rings 150 having a ring shape are disposed.

For example, the inner O-rings 150 may be formed of a rubber material or a material containing rubber.

Accordingly, a fluid may be prevented from infiltrating into the fixing body receiving recess 133 through the first housing through-holes 130h, and thus deterioration in the durability of the electrode terminal assembly 100 due to water leakage may be effectively prevented.

The electrode terminal assembly 100 according to this embodiment may be installed in a casing in which a liquid to be measured is stored. The first housing body 131 may include a fastening part 135 through which the electrode terminal assembly 100 is able to be coupled with the casing in which the liquid to be measured is stored.

The electrode terminal assembly 100 may further include an outer O-ring 160 that forms a seal between the casing and the electrode terminal assembly 100 when the electrode terminal assembly 100 is coupled with the casing in which the liquid to be measured is stored.

Hereinabove, although the present disclosure has been described with reference to the exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An electrode terminal assembly for a liquid quality meter apparatus for measuring liquid quality based on electrical resistance of a liquid to be measured, the electrode terminal assembly comprising:
   a pair of electrode terminals brought into contact with the liquid to be measured, when the liquid quality is measured, wherein each of the electrode terminals includes a body having an overall rod shape and a protrusion formed on a predetermined portion between opposite ends of the body; and
   a fixing body including a pair of electrode through-holes through which the pair of electrode terminals pass,
   wherein when the electrode terminals are inserted into the electrode through-holes of the fixing body by a predetermined length, the protrusions are stopped by the fixing body, and the electrode terminals are not inserted any more, and
   wherein to receive the protrusions, the fixing body has a shape in which portions configured to make contact with the protrusions of the pair of electrode terminals are inwardly concave.

2. The electrode terminal assembly of claim 1, wherein each of the pair of electrode terminals includes one end configured to pass through the fixing body and an opposite end opposite to the one end, wherein the fixing body includes a main body and a pair of fixing body extensions, each of which extends from the main body of the fixing body toward the opposite end of a corresponding one of the electrode terminals, and wherein the pair of electrode through-holes are formed through the main body of the fixing body and the respective fixing body extensions.

3. An electrode terminal assembly for a liquid quality meter apparatus for measuring liquid quality based on electrical resistance of a liquid to be measured, the electrode terminal assembly comprising:

a pair of electrode terminals brought into contact with the liquid to be measured, when the liquid quality is measured, wherein each of the electrode terminals includes a body having an overall rod shape and a protrusion formed on a predetermined portion between opposite ends of the body;

a fixing body including a pair of electrode through-holes through which the pair of electrode terminals pass; and first and second housings configured to receive the fixing body and the pair of electrode terminals, wherein when the electrode terminals are inserted into the electrode through-holes of the fixing body by a predetermined length, the protrusions are stopped by the fixing body, and the electrode terminals are not inserted any more, wherein each of the pair of electrode terminals includes one end configured to pass through the fixing body and an opposite end opposite to the one end, wherein the first housing includes a fixing body receiving recess in which the fixing body is received, wherein a pair of first housing through-holes are formed in a bottom surface of the fixing body receiving recess so as to be open toward the outside of the first housing, wherein to prevent the pair of electrode terminals from being separated from the fixing body, the opposite end of each of the pair of electrode terminals passes through a corresponding one of the first housing through-holes, and the protrusion of the electrode terminal does not pass through the corresponding one of the first housing through-holes and is stopped by the bottom surface of the fixing body receiving recess, and wherein the opposite end of the electrode terminal is exposed outside the first housing through the corresponding one of the first housing through-holes.

4. The electrode terminal assembly of claim 3, further comprising:

a pair of inner O-rings interposed between inside ends of the first housing through-holes and the protrusions of the pair of electrode terminals to prevent infiltration of a fluid into the fixing body receiving recess through the first housing through-holes.

5. The electrode terminal assembly of claim 3, wherein the second housing has a shape including a center hole to provide a space in which a pair of terminals are received, each of which is connected with the one end of a corresponding one of the electrode terminals, the one end being configured to pass through the fixing body.

6. The electrode terminal assembly of claim 3, wherein the first housing includes a first housing body having the fixing body receiving recess formed thereon and a first housing extension extending from the first housing body in an extension direction of the pair of electrode terminals, and wherein the first housing through-holes extend in the extension direction of the pair of electrode terminals and are formed through the first housing extension.

7. An electrode terminal assembly for a liquid quality meter apparatus for measuring liquid quality based on electrical resistance of a liquid to be measured, the electrode terminal assembly comprising:

a pair of electrode terminals brought into contact with the liquid to be measured, when the liquid quality is measured, wherein each of the electrode terminals includes a body having an overall rod shape and a protrusion formed on a predetermined portion between opposite ends of the body;

a fixing body including a pair of electrode through-holes through which the pair of electrode terminals pass; and first and second housings configured to receive the fixing body and the pair of electrode terminals, wherein when the electrode terminals are inserted into the electrode through-holes of the fixing body by a predetermined length, the protrusions are stopped by the fixing body, and the electrode terminals are not inserted any more, and wherein one of the first and second housings includes a female thread, the other includes a male thread, and the first and second housings are screw-coupled with each other.

8. A liquid quality meter apparatus for measuring liquid quality based on electrical resistance of a liquid to be measured, the liquid quality meter apparatus comprising:

an electrode terminal assembly; and a controller configured to apply power to the electrode terminal assembly, wherein the electrode terminal assembly includes:

a pair of electrode terminals, each of which includes a body having an overall rod shape and a protrusion protruding from the body to a side;

a fixing body including a pair of electrode through-holes through which the pair of electrode terminals pass, and first and second housings configured to receive the fixing body and the pair of electrode terminals, and wherein when the electrode terminals are inserted into the electrode through-holes of the fixing body by a predetermined length, the protrusions are stopped by the fixing body, and the electrode terminals are not inserted any more wherein each of the pair of electrode terminals includes one end configured to pass through the fixing body and an opposite end opposite to the one end, wherein a pair of first housing through-holes are formed so as to be open toward the outside of the first housing, wherein to prevent the pair of electrode terminals from being separated from the fixing body, the opposite end of each of the pair of electrode terminals passes through a corresponding one of the first housing through-holes, and the protrusion of the electrode terminal does not pass through the corresponding one of the first housing through-holes and is stopped by the first housing, and wherein the opposite end of the electrode terminal is exposed outside the first housing through the corresponding one of the first housing through-holes.

* * * * *